(12) United States Patent
Aly et al.

(10) Patent No.: US 9,189,853 B1
(45) Date of Patent: *Nov. 17, 2015

(54) AUTOMATIC POSE ESTIMATION FROM UNCALIBRATED UNORDERED SPHERICAL PANORAMAS

(71) Applicant: Google Inc., Mountain View, CA (US)

(72) Inventors: Mohamed Aly, Mountain View, CA (US); Jean-Yves Bouguet, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/306,757

(22) Filed: Jun. 17, 2014

Related U.S. Application Data

(63) Continuation of application No. 13/307,272, filed on Nov. 30, 2011, now Pat. No. 8,787,700.

(51) Int. Cl.
  *G06T 7/00* (2006.01)
  *G06K 9/00* (2006.01)

(52) U.S. Cl.
  CPC .......... *G06T 7/0038* (2013.01); *G06K 9/00664* (2013.01); *G06T 7/0042* (2013.01)

(58) Field of Classification Search
  CPC ..... G06T 19/003; G06T 19/00; G06T 7/0024; G06T 3/20; G06T 7/0042; G06T 7/0044; G06T 17/00
  USPC .......... 382/154, 192, 216, 294, 295
  See application file for complete search history.

(56) References Cited

U.S. PATENT DOCUMENTS

| | | | |
|---|---|---|---|
| 6,246,412 B1 * | 6/2001 | Shum et al. | 345/419 |
| 8,787,700 B1 * | 7/2014 | Aly et al. | 382/294 |
| 2003/0164838 A1 | 9/2003 | Guo et al. | |
| 2010/0118161 A1 * | 5/2010 | Tsurumi | 348/231.3 |

\* cited by examiner

*Primary Examiner* — Amir Alavi
*Assistant Examiner* — Kenny Cese
(74) *Attorney, Agent, or Firm* — Lerner, David, Littenberg, Krumholz & Mentlik, LLP

(57) ABSTRACT

Methods and systems for automatically generating pose estimates from uncalibrated unordered panoramas are provided. An exemplary method of automatically generating pose estimates includes receiving a plurality of uncalibrated and unordered panoramic images that include at least one interior building image, and extracting, for each panoramic image, feature points. The method includes generating a match matrix for all the panoramic images based on the one or more feature points, constructing a minimal spanning tree based on the match matrix, identifying a first and second panoramic image, based on the minimal spanning tree, wherein the second panoramic image is associated with the first panoramic image providing a navigation from the first panoramic image to the second panoramic image.

20 Claims, 9 Drawing Sheets

AUTOMATIC POSE ESTIMATION FROM UNCALIBRATED UNORDERED SPHERICAL PANORAMAS

CROSS REFERENCE TO RELATED APPLICATIONS

The present application is a continuation of U.S. patent application Ser. No. 13/307,272, filed on Nov. 30, 2011, the disclosure of which is incorporated herein by reference.

BACKGROUND

1. Field

Embodiments relate to indoor navigation and exploration.

2. Related Art

Maps provide navigation assistance but do not present a visual depiction of the environment. Recently, pictorial images such as panoramic images have been associated with outdoor map locations as a further visual aid for navigation. While this approach provides a navigation aid to locate a particular destination, e.g., a restaurant, it does not provide a user with an indoor navigation and exploration tool to explore the look and layout of the interior of an establishment. Panoramic images of indoor scenes have been captured but require manual sequencing to associate one particular panoramic image with another to provide a user a navigation tool within the interior space. More advanced approaches to indoor panoramic image capture are often limited to moving camera devices along fixed paths or require expensive external positioning systems to support navigation of the moving camera device and capture of ordered images.

BRIEF SUMMARY

According to an embodiment, a method for automatic pose estimation includes receiving a plurality of panoramic images, which are uncalibrated and unordered, where at least one of the panoramic images includes an interior building image. From each of the panoramic images one or more feature points are extracted. Then, based on the one or more feature points, a match matrix is generated and a minimal spanning tree is constructed, based on the match matrix. From the minimal spanning tree a first and second panoramic image is identified where the second panoramic image is associated with the first panoramic image that provides a navigation from the first panoramic image to the second panoramic image.

According to an embodiment, a system for automatic pose estimation includes a panoramic image storage module to store a plurality of panoramic images, which are uncalibrated and unordered, where at least one of the panoramic images includes an interior building image. The system includes a feature match module that extracts, from each panoramic image, one or more feature points and generates a match matrix for all the panoramic images based on the feature points. Further, the system includes a minimal spanning tree generator that generates a minimal spanning tree based on the match matrix and identifies a first and second panoramic image and provides a navigation from the first panoramic image to the second panoramic image.

According to another embodiment, a computer program product, in response to execution by a computing device, causes a computing device to perform operations that include receiving a plurality of panoramic images, which are uncalibrated and unordered, wherein at least one of the panoramic images includes an interior building image. The operations further include extracting, for each panoramic image, one or more feature points, and generating a match matrix for all the panoramic images based on the one or more feature points. The operation continues by constructing a minimal spanning tree based on the match matrix, identifying a first and second panoramic image, based on the minimal spanning tree, wherein the second image is associated with the first panoramic image providing a navigation from the first panoramic image to the second panoramic image. Further, the operation includes identifying, from the minimal spanning tree, one or more image triplets wherein each image triplet comprises a panoramic image associated with both a parent panoramic image and a child panoramic image. Further, the method includes estimating a relative pose of each image triplet, estimating a relative scale of a triplet that contains the first panoramic image, and propagating the relative scale of the triplet containing the first panoramic image to another triplet that does not contain the first panoramic image, wherein the first panoramic image represents a root of the minimal spanning tree.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

I. Introduction

Embodiments of this disclosure relate to indoor navigation and exploration using uncalibrated unordered panoramas. Uncalibrated unordered panoramic images are panoramic images that have not been analyzed to determine which image is connected to another image that allows a user to navigate, using the images, from one position to another. For example, a set of uncalibrated unordered spherical images could consist of multiple indoor panoramas of an establishment that are not arranged in any particular order and therefore do not present a navigable path through the establishment. This disclosure addresses an automatic pose estimation system and method that accepts as an input the set of unordered uncalibrated panoramic images, analyzes the images, and sequences the images in the correct order. This sequencing of the panoramic images allows a user to pictorially navigate through the establishment.

Embodiments relate to automatically estimating the relative pose of a set of unordered uncalibrated spherical panoramas by operating on a set of panoramas taken at a particular location and producing an estimate of the location and orientation of each panorama relative to a designated reference panorama. In such a situation there is no other information available other than the visual content, e.g., no global positioning system or depth data. Uncalibrated cameras can be used to capture the panoramic image, which result in the estimation of only a relative pose. However, for the purpose of visual exploration of a location, a relative pose is sufficient as the relative placement of the panoramas provide a methodology to connect and navigate through the various panoramas.

While embodiments described herein are illustrative embodiments for particular applications, it should be understood that this disclosure is not limited thereto. Those skilled in the art with access to the teachings provided herein will recognize additional modifications, applications, and embodiments within the scope thereof and additional fields in which the disclosure would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

II. Overview

Figure 1:
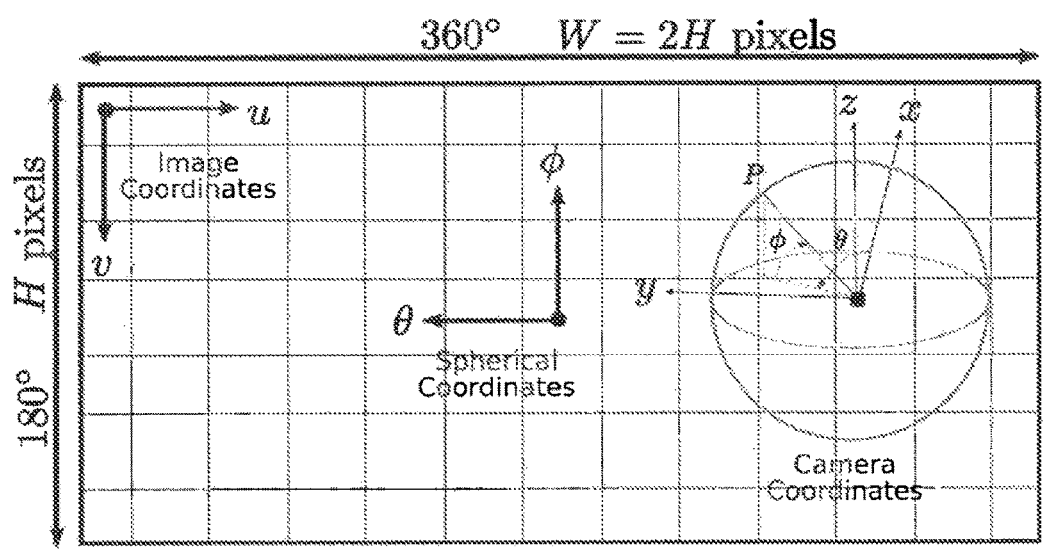
FIG. 1 shows an exemplary coordinate axes definition, according to an embodiment.

FIG. 1 is an example coordinate axes definition that is used throughout this disclosure. The image width shown in FIG. 1 is an entire viewing sphere of 360° with a 180° viewing height where the width of the image in pixels is twice the height of the image in pixels. The image pixel coordinate axes are defined by (u, v). The image coordinates correspond directly to points on the viewing sphere (θ, φ) with the X-axis pointing forward towards the center of the image, the Y-axis pointing left, and the Z-axis pointing upwards.

This coordinate system is used as an example only to explain the notations used in figures throughout this disclosure. Other coordinate systems can be used and as such this example coordinate definition in FIG. 1 is not meant to limit or constrain the disclosure in any way.

Automatic pose estimation from a set of images can be viewed as falling into two different categories, depending on the nature of the image collection. For example, images typically can be classified as ordered video sequences or as unordered images. In a ordered video sequence there is no ambiguity about which images to use for pose estimation, and it is usually assumed that the motion between successive frames is small. However, in an unordered set of images, the choice of image pairs and triplets is much more difficult as there is usually no apriori knowledge of which images depict similar content.

III. Motion Model and Pose Estimation

A. Camera and Motion Models

In this disclosure, given that the inputs to the automatic pose estimation system can be spherical panoramas taken from spherical camera models, the eye of the camera is depicted at the center of the unit sphere, see FIG. 1, and pixels on the panoramic image correspond directly to points in the camera frame on the unit sphere. For example, let $\{I\}=\{u,v\}$ be the image coordinate frame, with u going horizontally and v vertically. Let (u, v) define a pixel on the image, and then let (θ, φ) define the spherical coordinates of the corresponding point on the unit sphere where $\theta=(W-2u)/(W)*\pi \epsilon[-\pi, \pi]$ and $\phi=(H-2v)/(2H)*\pi \epsilon[-\pi/2, \pi/2]$. The camera frame $\{C\}=\{x,y,z\}$ is at the center of the sphere, with the X-axis pointing forward (θ=0), the Y-axis pointing left (θ=π/2), and the Z axis pointing upwards (φ=π/2). Given (θ, φ) coordinates of a point on the unit sphere, the coordinates in the camera frame are then given as: x=cos φ cos θ, y=cos φ sin θ, and z=sin φ.

In an embodiment, a planar motion model for the cameras is assumed, e.g., all of the camera frames lie on the same plane. Such an assumption is reasonable as, in an embodiment, the main interest is in constructing a planar relative map of the image set, and by assuming a planar motion, the number of degrees of freedom is reduced thereby increasing the robustness of pose estimates. Given that all the camera frames lie on the same plane, e.g., taken at the same camera height, there are only three degrees of freedom, two degrees consisting of the X and Y planes, and the third consisting of a rotational element of the camera.

B. Pose Estimation

Figure 2:
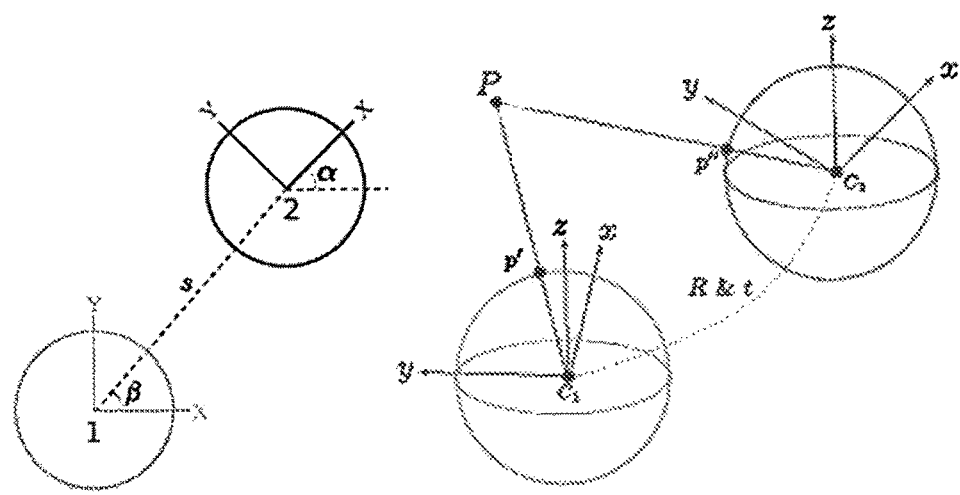
FIG. 2 shows an exemplary motion model and two-view geometry, according to an embodiment.
Figure 3:
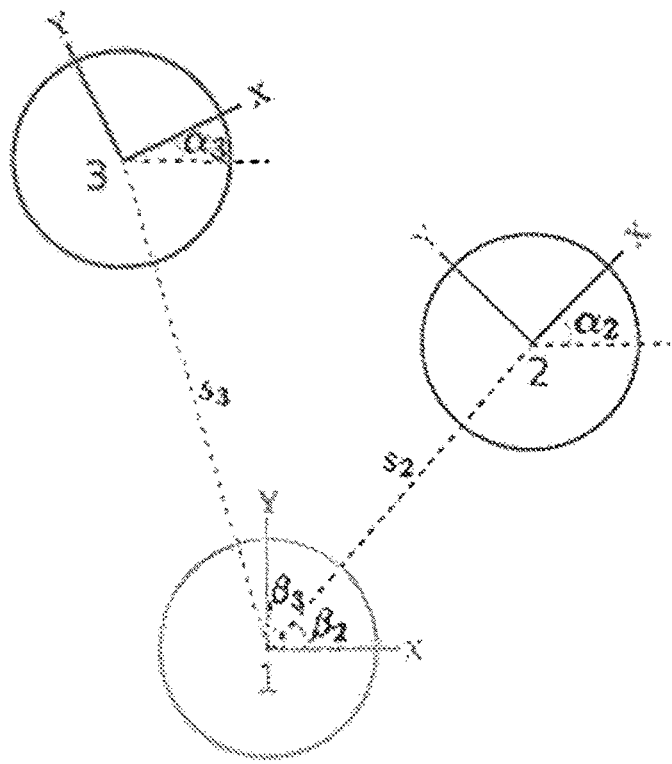
FIG. 3 shows an exemplary triplet planar motion model using three cameras, according to an embodiment.

In an embodiment, given two camera frames, it is desired to estimate two motion parameters consisting of at least, the direction of motion, e.g., β and the relative rotation α, see FIG. 2. Since the cameras can be uncalibrated, the scale of translation s between the two cameras cannot be estimated. One can define the camera poses $M_1=\{I,0\}$ and $M_2=\{R, st\}$ such that the first camera frame is at the origin of a fixed world frame and the second camera frame is described by a 3×3 rotation matric R and a 3×1 unit translation vector t and scale s. Given a point P that is visible from both cameras and that has coordinates p' and p" in the first and second cameras, they can be related by p'=Rp"+st, which means that the three vectors p', Rp", and st are coplanar, similar to the epipolar constraint in a planar pinhole camera, see FIG. 2.

FIG. 2 is an illustration of a motion model and two-view geometry. The motion model on the left of FIG. 2 represents a projection of the camera frames on the X-Y plane. It is assumed that there is a planar motion between cameras one and two, and that the intent is to estimate the direction of motion β and the relative rotation α. As previously mentioned, when two uncalibrated cameras are used it is not possible to estimate the scale s. The two-view geometry on the right of FIG. 2 represents where point P is viewed in the two cameras as p' and p" where the epipolar constraint is given by:

$$p'^T E p''=0 \qquad \text{(equation 1)}$$

where E is the essential matrix defined by $E=[t]_x R$ where $[a]_x$ is the skew symmetric matrix such that $[a]_x b = a*b$. As planar motion is being assumed, the following matrixes define the rotation matrix R and the translation vector t:

$$R = \begin{bmatrix} \cos\alpha & -\sin\alpha & 0 \\ \sin\alpha & \cos\alpha & 0 \\ 0 & 0 & 1 \end{bmatrix}$$

$$t = \begin{bmatrix} \cos\beta \\ \sin\beta \\ 0 \end{bmatrix}$$

The above gives the following form for the essential matrix E:

$$E = \begin{bmatrix} 0 & 0 & e_{13} \\ 0 & 0 & e_{23} \\ e_{31} & e_{32} & 0 \end{bmatrix} \quad \text{(equation 2)}$$

By writing equation 1 in terms of the entries of E, one can solve for the four unknowns in equation 2 using least squares minimization to obtain an estimate $\hat{E}$. From $\hat{E}$ it is possible to extract the rotation matric R, and a, and the unit translation vector t, and β. Since E is defined only up to scale, at least three corresponding points are needed to estimate the four entries of E. This estimation procedure is then input into an estimation scheme, e.g., RANSAC, for outlier rejection.

In order to be able to estimate the scale of the translation, more than two cameras are needed at the same time. Given that three cameras are used, and assuming planar motion, it is possible to estimate five motion parameters, including rotation $\alpha_2$ and translation direction $\beta_2$ for camera two relative to camera one, rotation $\alpha_3$ and translation direction $\beta_3$ for camera three relative to camera one, and the ratio of the translation scales $s_3/s_2$. Without loss of generality, by setting $s_2=1$ it is possible to estimate the five parameters $\alpha_2, \alpha_3, \beta_2, \beta_3, s_3$. This can be done in at least two ways, given point correspondences in the three cameras, including estimating the trifocal tensor $T_{ijk}$, and extracting the five motion parameters, or by estimating pair-wise essential matrices $E_{12}$ and $E_{13}$ which produce $\alpha_2, \alpha_3, \beta_2, \beta_3$, see FIG. 4.

Figure 4:
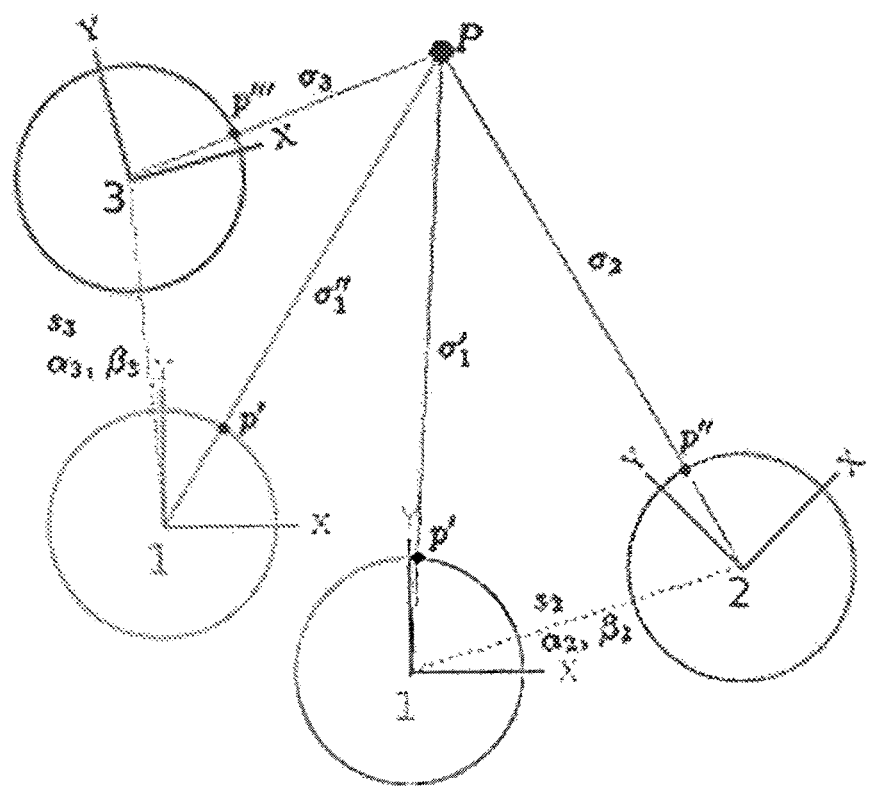
FIG. 4 shows an exemplary two-step triplet planar pose estimation, according to an embodiment.

FIG. 4 illustrates two-step triplet planar pose estimation where a first estimate of the relative pose is made for each pair, specifically pair 1 and 2, and pair 1 and 3, independently. By triangulating a common point P in the three cameras and obtaining its three dimensional position in each pair, it is possible to estimate $s_3$ by forcing its position in the common camera one to be the same, e.g., $s_3=\sigma_{12}/\sigma_{13}$.

In order to obtain the relative scale $s_3$ it is possible to triangulate a common point P in the two pairs and force its scale in the common camera to be consistent. In particular, considering the pair 1 and 2, and given the projections p' and p" of a common point P on the two camera, the coordinates of P in the frames of cameras 1 and 2 can be computed as $P'_2=p'\sigma_{12}$ and $P''_2=p''\sigma_2$, respectively. Similarly, considering cameras 2 and 3, it is possible to compute $P'_3=p'\sigma_{13}$ and $P'''_3=p'''\sigma_3$, since in camera 1, the common frame, the two three dimensional estimates of the same point should be equal, e.g., $P'_2$ should be equal to $P'_3$, such that it is possible to compute $s_3=\sigma_{12}/\sigma_{13}$. Through experimentation it was found that the second approach performed better as there are usually very few correspondences across the three cameras to warrant a robust estimate of the trifocal tensor.

IV. Triplets Selection and Pose Propagation

For the processing of ordered video sequences there is no ambiguity about which triplets to choose. Local features are extracted and matched or tracked in consecutive frames, which usually have a fair number of common features. However, when processing unordered panoramic images, the input panoramas have no order, and thus an efficient and effective method is needed to choose which image pairs and triplets to consider for pose estimation. In an embodiment, there are three requirements for the proper selection of triplets. First, the pairs in the triplet should have as many common features as possible. Second, every image should be covered by at least one triplet. Third, every triplet should overlap with at least one other triplet. Satisfying these requirements ensures that there are enough correspondences for robustly estimating the pose, that all the panoramas are included in the output relative map, and that the scale and pose are propagated correctly.

Figure 5:
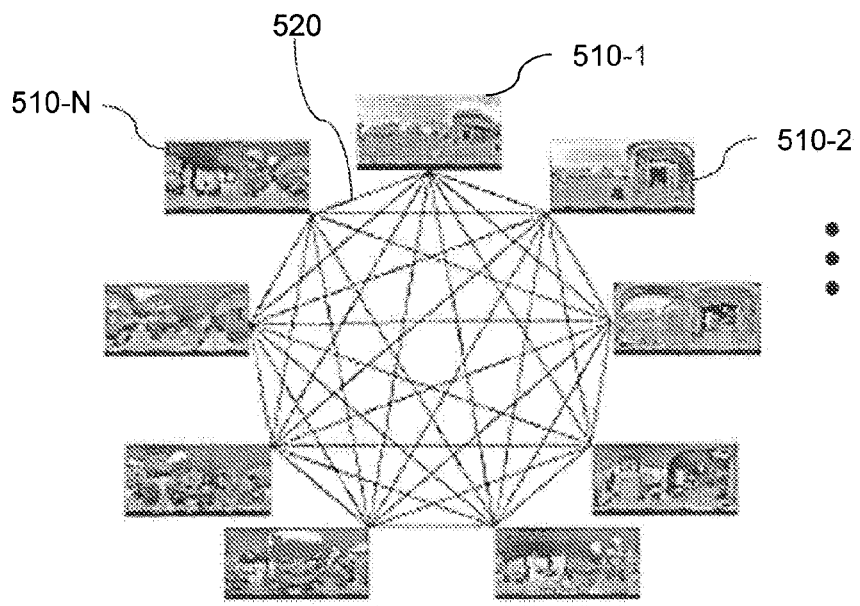
FIG. 5 shows an exemplary image triplet selection as a complete matching graph, according to an embodiment.
Figure 6:
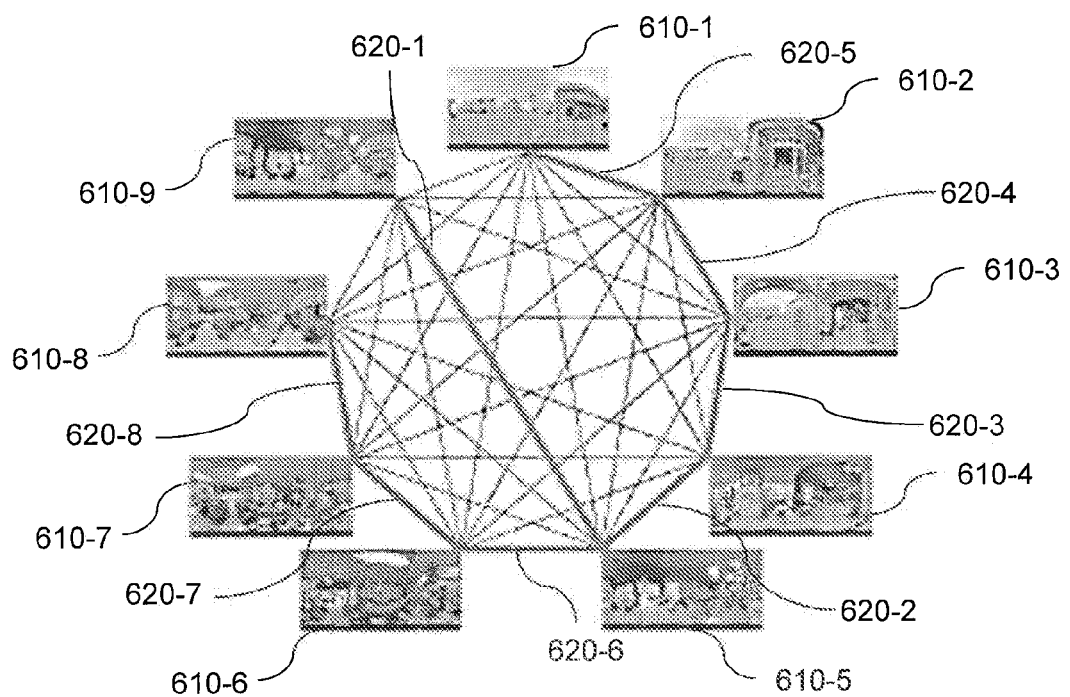
FIG. 6 shows an exemplary image triplet selection as a minimal spanning tree, according to an embodiment.
Figure 7:
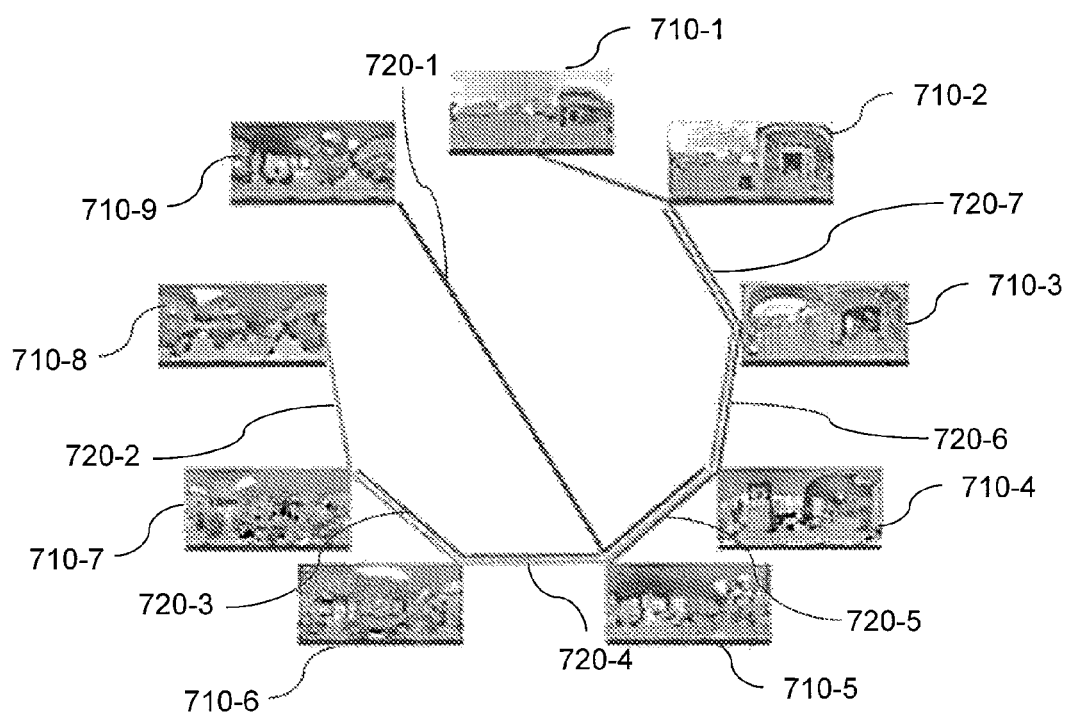
FIG. 7 shows an exemplary image triplet selection as an image triplet, according to an embodiment.

In an embodiment, an algorithm identifies triplets of images in accordance with the above described three processing requirements. A minimal spanning tree (MST) is used to generate image pairs with an extensive number of matching features, which is then used to extract overlapping triplets. The use of a minimal spanning tree to generate image pairs and overlapping triplets is shown in FIG. 5, FIG. 6, and FIG. 7. FIG. 5 illustrates a complete weighted graph where the edge weight is inversely proportional to the number of matching features.

In an embodiment local features are computed for every input image 510-1, 510-2, through 510-N. Each local feature is associated with a descriptor that describes the feature. In addition, the location of the feature within the image is also known. The known location and descriptor of a local feature within an image are then used for similarity matching to other features in the other images.

The process of detecting, identifying, and matching features includes analyzing shapes and appearances contained within an image. Feature detectors such as Hessian Affine, Harris Affine, and MSER, together with a SIFT descriptor can be used. Such detectors can extract features from a full resolution image.

After the features have been detected and identified, a complete weighted matching graph G is computed, e.g., FIG. 5. The vertices of the graph are the individual images, e.g., 510-1 through 510-N. Edges 520 in FIG. 5 indicate the connection between each image and also are associated with a weight that is inversely proportional to the number of putative matching features between the two vertices of each edge. The complete graph of N vertices has N (N−1)/2 edges. For example, the 9 images in FIG. 5 generate 36 unique image pairs. Matching can be accomplished using Kd-trees to approximately match feature descriptors.

FIG. 6 illustrates the use of a minimal spanning tree that spans the entire graph of images 610-1 through 610-9 and only includes edges with minimal weight, as indicated by edges 620-1 through 620-8. The minimal spanning tree ensures that every image is covered by exactly one pair, e.g., edge 620-1 connects image pair 610-9/610-5. Further, the minimal spanning tree ensures that the pairs contain the maximum possible number of matches between them.

FIG. 7 illustrates the identification of triplets from the minimal spanning tree that are formed by connecting every node in the tree to its grandchildren. Identifying image triplets (i, j, k) satisfies the previously discussed requirement of having each triplet overlap with at least one other triplet. FIG. 7 identifies the following triplets:

| Triplet | Images |
|---|---|
| 720-1 | 710-9, 710-5, 710-4 |
| 720-2 | 710-8, 710-7, 710-6 |
| 720-3 | 710-7, 710-6, 710-5 |
| 720-4 | 710-6, 710-5, 710-4 |
| 720-5 | 710-5, 710-4, 710-3 |
| 720-6 | 710-4, 710-3, 710-2 |
| 720-7 | 710-3, 710-2, 710-1 |

Triplet 720-1 represents the root triplet with image 710-9 as the start, or root, of the tree. FIG. 7 illustrates how a user would navigate through the location captured by images 710-1 through 710-9 where the user would enter the location at image 710-9 and proceed to image 710-5. At image 710-5 the user would have the option of proceeding in one of two directions, to image 710-4 that would proceed to images 710-3, 710-2, and 710-1, or to image 710-6 that would proceed to images 710-7, 710-8 and 710-9.

Figure 8:
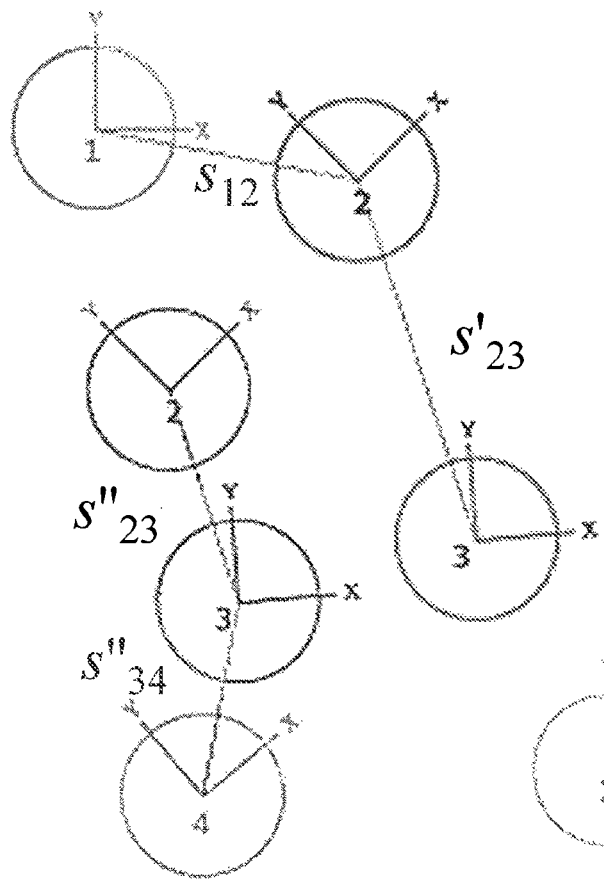
FIG. 8 shows an exemplary set of two overlapping triplets of images, according to an embodiment.

In an embodiment, the local pose of each triplet is then estimated, and the overlapping property is used to propagate pose and scale from the root of the minimal spanning tree throughout the remaining images in the tree. FIG. 8 illustrates two overlapping triplets of images (1, 2, 3) and (2, 3, 4). In order to propagate the scale throughout the tree, the scale of the first image triplet, e.g., (1, 2, 3), must be propagated to the second image triplet, e.g., (2, 3, 4). This is accomplished by forcing the scale of the second triplet to be equal to the scale of the first triplet. This is done, as shown in FIG. 8, by forcing $s''_{23}$ to be equal to $s'_{23}$. In addition, to complete the scaling propagation to the second image triplet, the scale factor $s''_{34}$ must also be adjusted by the same factor as $s'_{23}$, e.g., $s_{23}/s''_{23}=s_{34}/s''_{34}$. Scale propagation is initiated from the root of the minimal spanning tree. In the same manner, pose propagation is also initiated from the root of the minimal spanning tree, where given the local pose of triplets (i, j, k) and (j, k, l) the pose of image 1 is adjusted such that it is relative to image i from the first triplet.

Figure 9:
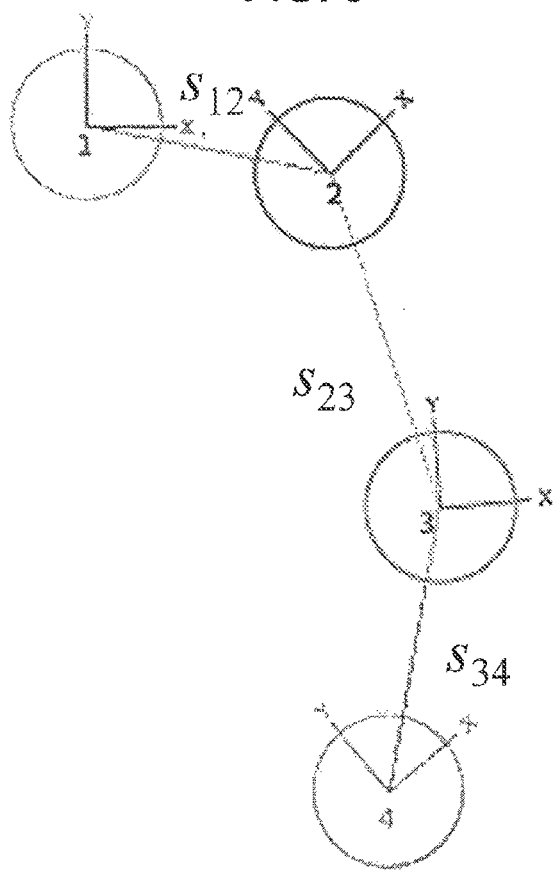
FIG. 9 shows an exemplary pose and scale propagation based on FIG. 8, according to an embodiment.

FIG. 9 illustrates the combining of the first and second image triplets, including the corrected scaling of the second image triplet. In this same manner the scaling adjustment is applied to any further connected triplets so that the entire tree of images will be correctly scaled.

V. Root Image Pose and Scale

Although the scale of all of the triplets can be matched to the scale of the first triplet, the scale propagation is still relative as the absolute scale of the root image may not be known. In the same manner, while the pose of the first image triplet has been propagated throughout the tree, the absolute pose of the root image may also not be known.

In many situations the lack of absolute pose and image does not present an issue. For example, if a user is navigating through the interior of a restaurant it is probably not important which direction is north, or to know exactly the height of a chair.

However, in some circumstances such pose and scale information may be of value. In such a situation, given that the location of the root image is known, e.g., the location is a store with an address, and through existing geocode mapping databases the pose, e.g., position and orientation, of an outside entrance can be determined. This pose information can include latitude and longitude coordinates in addition to orientation. The pose information can then be applied to the minimal spanning tree and represent actual pose information versus relative pose information.

In the same manner scale information can be propagated. Given that a root image was obtained with a calibrated camera, size and absolute scaling can be determined. In addition, if an uncalibrated camera is used for the root image, but the distance from the camera to the image is known, it is possible to obtain an estimated scale by estimating the size of a known object, such as the size of a doorway.

VI. Automatic Pose Estimation System

Figure 10:
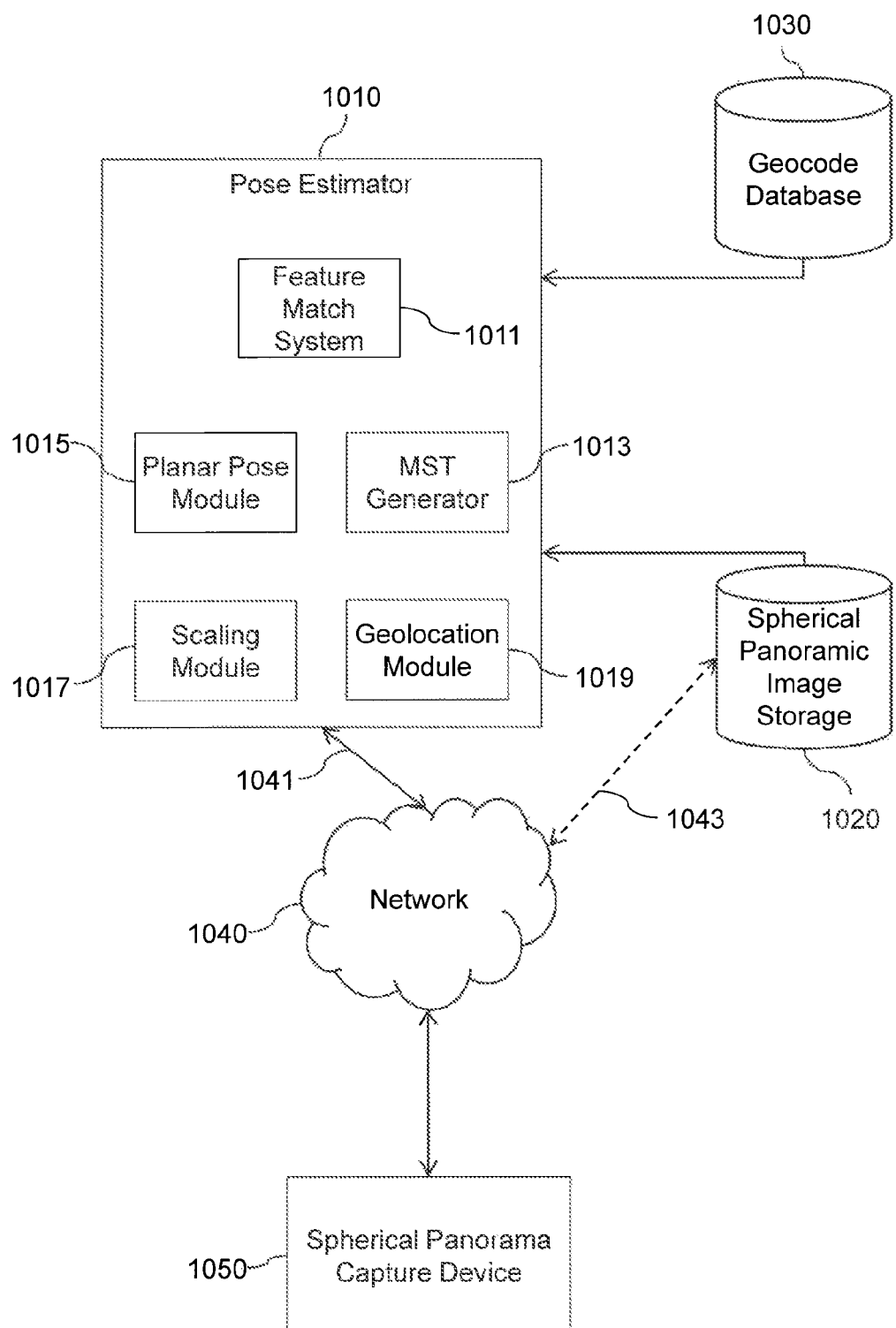
FIG. 10 shows an exemplary framework overview of an automatic pose estimation system, according to an embodiment.

FIG. 10 illustrates a pose estimation system 1000, according to an embodiment. In the example shown in FIG. 10, system 1000 includes pose estimator 1010, spherical panoramic image storage 1020, geocode database 1030, network 1040, and spherical panorama capture device 1050. Pose estimator 1010 further includes feature match system 1011, minimal spanning tree (MST) generator 1013, planar pose module 1015, and scaling module 1017.

In an embodiment, spherical panorama capture device 1050 captures 360° wide by 180° high panoramic images. Spherical panorama capturer device 1050 can be mounted on a tripod or other structure to maintain a constant planar orientation such that the captured frames lie on the same plane. In other embodiments, spherical panorama capture device 1050 captures cubic panorama and/or cylindrical panorama images that are either interior and/or exterior images. Captured panoramic images can be stored directly to spherical panoramic storage 1020, or the images can be sent via network 1040 and path 1043 to spherical panoramic storage 1020 for access and processing by pose estimator 1010. In an embodiment spherical panorama capture device 1050 can send images via network 1040 and path 1041 to pose estimator 1010.

Spherical panoramic image storage 1020 can store images that have been captured from other image capture devices, such as a mobile handheld image capture device, where such images can be sent via network 1040.

Pose estimator 1010 accepts as input a set of unordered uncalibrated spherical panoramic images that have previously been captured and stored on spherical panoramic storage 1020 or that are received via a network, such as network 1040. Images, once received by pose estimator 1010, are first processed by feature match system 1011. Feature match system 1011, for each received image, identifies features within the image and generates an associated descriptor. Feature match system 1011 can utilize any type of feature detector such as a Hessian Affine, Harris Affine, and MSER, together with a SIFT descriptor.

Further, feature match system 1011 compares the identified features from each image in a set of images, with the identified features in all of the other panoramic images. Feature match system 1011 validates matches between images and deletes duplicates, or any image that do not rigidly match, e.g., images that are detected to be moving. System 1011 also eliminates any false matches. Feature match system 1011 performs this same matching, validating, and deletion of duplicates for each of the images within the set of images.

Based on the analysis of images, feature match system 1011 generates a complete weighted matching graph that indicates the connection between each image and a weighted value based on the number and quality of matched features.

Once the weighted matching graph is complete, MST generator 1013 generates a minimal spanning tree that ensures that each image in the set of images is covered by exactly one image-pair. MST generator 1013 also ensures that the possible number of matches between the image-pair is maximized Planar pose module 1015 analyzes the minimal spanning tree to identify all possible image triplets. An image triplet is a set of three images where one image has both a parent image and a child image. In the process of identifying all the triplet images a root image triplet is identified. The root image triplet contains a root image where the root image does not have a parent image. The root image can be considered to be the start, or first panoramic image. For example, the root image could be an image of an entrance to an establishment in which a user would enter to view the interior of the building.

Once planar pose module 1015 identifies all the triplets in the minimal spanning tree, scaling module 1017 propagates pose and scale information from the triplet containing the root image to all other identified triplets as previously described.

Pose and scaling that is propagated throughout the minimal spanning tree is based on the relative pose and scaling of the root image. Geolocation module 1019 is used to provide absolute pose and/or scaling information associated with the root image that can be propagated to all of the image triplets. Geolocation module 1019 access geocode database 1030 that contains mapping and geocode information such as latitude and longitude such that an absolute location and orientation can be obtained for a specific image in the root panoramic image. Geocode database 1030 can be any type of private or commercially available database, including data that could be input by users utilizing any type of mobile communication device.

VII. Methods

Methods in accordance with embodiments will be described with respect to the automatic pose estimation methodology described in FIGS. 1-9 and the system described in FIG. 10, without limitation.

Figure 11:
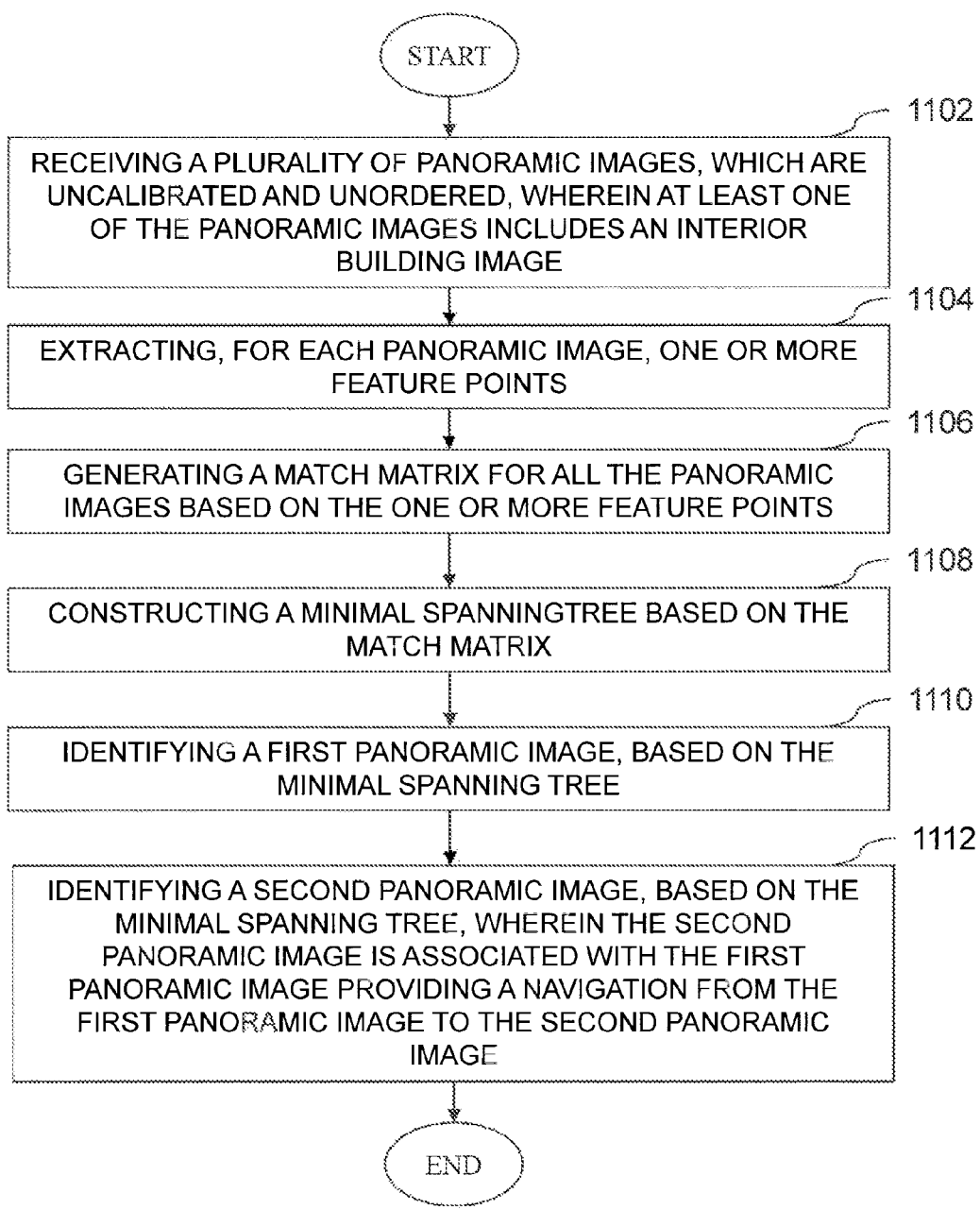
FIG. 11 shows an exemplary method of an automatic pose estimation system, according to an embodiment.

FIG. 11 is a flowchart of an exemplary method 1100 for automatic pose estimation from uncalibrated unordered spherical panoramas. For ease of explanation, method 1100 is described with respect to pose estimation system of FIG. 10 using the methodology described in FIGS. 1-9, but embodiments of the method are not limited thereto.

Method 1100 begins at step 1101 with the receiving of a plurality of panoramic images, a set of images, which are uncalibrated and unordered, wherein at least one of the panoramic images includes an interior building image. In an embodiment, pose estimator 1010 receives a set of panoramic images, where such a set of images are retrieved from a storage system such as spherical panoramic storage 1020, or could be received through a network, such as network 1040. The set of images represent a location, for example, a retail store or restaurant, where a user can navigate through the panoramic images to enter the establishment and "walk" through the interior of the building. The received panoramic images are unordered, versus a video sequence where the individual image frames show a small amount of relative movement from one frame to another. Unordered panoramic images can be received in any order without any type of external indication as to how they should be connected to allow a smooth navigation from one image to the next. The received set of images can also include exterior images of an establishment to allow a user to recognize the location, such as from the street.

Method 1100 continues in step 1104 by extracting, for each panoramic image, one or more feature points. In an embodiment, feature match system 1011 analyzes each of the images in the received plurality of panoramic images to identify any features within the image. The feature can include attributes such as an appearance or shape, as well as the location of the feature within the image. A descriptor is created for each feature that is used for similarity matching to other feature points in the other images.

Method 1100 continues in step 1106 by generating a match matrix for all the panoramic images based on the one or more feature points. In an embodiment, feature match system 1011 generates a match matrix between all of the images in the set of received panoramic images that indicates the level of matching of the identified feature points between each of the images. The vertices of the matrix are the images in the plurality of received panoramic images. The matrix can also be referred to as a complete weighted matching graph where the weight of each edge, connecting one image to another, is inversely proportional to the number of putative matching features between two images. Such matching can be accomplished using Kd-trees to approximately match feature descriptors.

Method 1100 continues in step 1108 by constructing a minimal spanning tree based on the match matrix. In an embodiment, MST generator 1013 creates a minimal spanning tree based on the weighted matching graph. The minimal spanning tree creates a linkage that ensures each image in the set of images is covered by exactly one image-pair.

Method 1100 continues in step 1110 by identifying a first panoramic image, based on the minimal spanning tree. In an embodiment, planar pose module 1015 analyzes the minimal spanning tree to identify all possible image triplets. An image triplet is a set of three images where one image has both a parent image and a child image. In the process of identifying all the triplets a root image triplet is identified. The root image triplet contains a root image where the root image does not have a parent image. The root image can be considered to be the start, or first panoramic image.

Method 1100 continues in step 1112 by identifying a second panoramic image, based on the minimal spanning tree, wherein the second panoramic image is associated with the first panoramic image providing a navigation from the first panoramic image to the second panoramic image. In an embodiment, planar pose module 1015 identifies all possible image triplets. By starting at the root of the minimal spanning tree planar pose module 105 identifies overlapping triplets. The overlapping triplets therefore provide a navigation path through all of the images. Such a navigation path allows a user to traverse from one image to the next in a connected fashion to view all of the panoramic images in a logical, sequential matter.

VIII. Example Computer System Implementation

Embodiments shown in FIGS. 1-11, or any part(s) or function(s) thereof, may be implemented using hardware, software modules, firmware, tangible computer readable media having instructions stored thereon, or a combination thereof and may be implemented in one or more computer systems or other processing systems.

Figure 12:
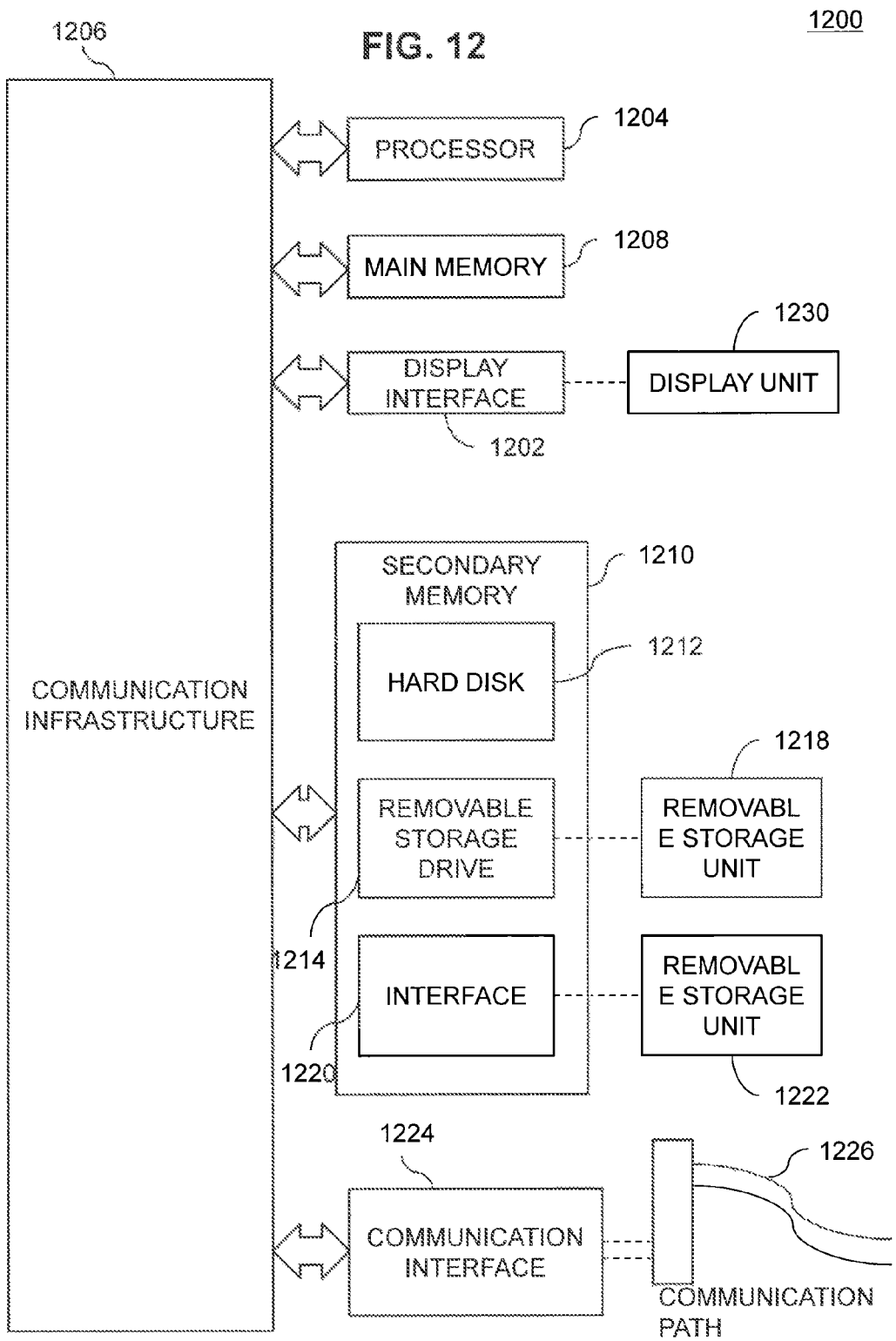
FIG. 12 is a diagram of an example computer system in which embodiments can be implemented.

FIG. 12 illustrates an example computer system 1200 in which embodiments, or portions thereof, may be implemented as computer-readable code. For example, the pose estimator shown in FIG. 10, including modules for implementing the functions and methods shown in FIG. 11 can be implemented in computer system 1200 using hardware, software, firmware, tangible computer readable media having instructions stored thereon, or a combination thereof and may be implemented in one or more computer systems or other processing systems. Hardware, software, or any combination of such may embody any of the modules and components in FIGS. 10 and 11.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 1200. After reading this description, it will become apparent to a person skilled in the relevant art how to implement embodiments of the present invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged or performed concurrently without departing from the spirit of the disclosed subject matter.

Processor device 1204 may be a special purpose or a general purpose processor device. As will be appreciated by persons skilled in the relevant art, processor device 1204 may also be a single processor in a multi-core/multiprocessor system, such system operating alone, or in a cluster of computing devices operating in a cluster or server farm. Processor device 1204 is connected to a communication infrastructure 1206, for example, a bus, message queue, network, or multi-core message-passing scheme.

Computer system 1200 also includes a main memory 1208, for example, random access memory (RAM), and may also include a secondary memory 1210. Secondary memory 1210 may include, for example, a hard disk drive 1212, removable storage drive 1214. Removable storage drive 1214 may comprise a floppy disk drive, a magnetic tape drive, an optical disk drive, a flash memory, or the like. The removable storage drive 1214 reads from and/or writes to a removable storage unit 1218 in a well-known manner. Removable storage unit 1218 may comprise a floppy disk, magnetic tape, optical disk, etc. which is read by and written to by removable storage drive 1214. As will be appreciated by persons skilled in the relevant art, removable storage unit 1218 includes a computer usable storage medium having stored therein computer software and/or data.

Computer system 1200 (optionally) includes a display interface 1202 (which can include input and output devices such as keyboards, mice, etc.) that forwards graphics, text, and other data from communication infrastructure 1206 (or from a frame buffer not shown) for display on display unit 1230.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Communications interface 1224 may include a modem, a network interface (such as an Ethernet card), a communications port, a PCMCIA slot and card, or the like. Software and data transferred via communications interface 1224 may be in the form of signals, which may be electronic, electromagnetic, optical, or other signals capable of being received by communications interface 1224. These signals may be provided to communications interface 1224 via a communications path 1226. Communications path 1226 carries signals and may be implemented using wire or cable, fiber optics, a phone line, a cellular phone link, an RF link or other communications channels.

In this document, the terms "computer program medium" and "computer readable medium" are used to generally refer to storage media such as removable storage unit 1218, removable storage unit 1222, and a hard disk installed in hard disk drive 1212. Computer program medium and computer readable medium may also refer to memories, such as main memory 1208 and secondary memory 1210, which may be memory semiconductors (e.g. DRAMs, etc.).

Computer programs (also called computer control logic) are stored in main memory 1208 and/or secondary memory 1210. Computer programs may also be received via communications interface 1224. Such computer programs, when executed, enable computer system 1200 to implement embodiments as discussed herein. In particular, the computer programs, when executed, enable processor device 1204 to implement the processes of embodiments of the present invention, such as the stages in the methods illustrated by flowcharts of FIG. 11, and discussed above. Accordingly, such computer programs represent controllers of the computer system 1200. Where embodiments are implemented using software, the software may be stored in a computer program product and loaded into computer system 1200 using removable storage drive 1214, interface 1220, and hard disk drive 1212, or communications interface 1224.

Embodiments of the invention also may be directed to computer program products comprising software stored on any computer readable medium. Such software, when executed in one or more data processing devices, causes a data processing device(s) to operate as described herein. Embodiments of the invention employ any computer useable or readable medium. Examples of non-transitory computer readable media include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.). Other computer readable media include communication mediums (e.g., wired and wireless communications networks, local area networks, wide area networks, intranets, etc.).

VII. Conclusion

Embodiments may be implemented in hardware, software, firmware, or a combination thereof. Embodiments may be implemented via a set of programs running in parallel on multiple machines.

The summary and abstract sections may set forth one or more but not all exemplary embodiments as contemplated by the inventor(s), and thus, are not intended to limit the present disclosure and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A computer implemented method, comprising:
   receiving, with one or more processors, a plurality of panoramic images, which are uncalibrated and unordered;
   extracting, with the one or more processors, for each panoramic image, one or more feature points;
   determining, with the one or more processors, associations among the plurality of panoramic images based on the feature points;
   grouping, with the one or more processors, the plurality of panoramic images based on the determined associations;
   selecting, with the one or more processors, a first panoramic image from the plurality of panoramic images based on the associations among the plurality of panoramic images;
   estimating, with the one or more processors, a relative scale of a group that contains the first panoramic image based on a relative pose of each group of panoramic images;
   identifying, with the one or more processors, a second panoramic image, wherein the second panoramic image is associated with the first panoramic image; and
   providing a navigation from the first panoramic image to the second panoramic image.

2. The method of claim 1, wherein the plurality of panoramic images comprises a plurality of spherical panoramic images.

3. The method of claim 1, wherein grouping the plurality of panoramic images comprises identifying, for each panoramic image, a parent panoramic image and a child panoramic image.

4. The method of claim 1, further comprising estimating the relative pose of each group of panoramic images.

5. The computer implemented method of claim 1, wherein:
   at least one of the received plurality of panoramic images includes an interior building image; and
   the selected first panoramic image includes an entrance to the interior building.

6. The method of claim 1, further comprising:
   propagating the relative scale of the group containing the first panoramic image to another group that does not contain the first panoramic image.

7. The method of claim 1, further comprising:
   determining a location and a heading of the first panoramic image based on geographic information contained in a geocode database.

8. The method of claim 1, wherein one or more panoramic images comprises a rigid structure.

9. The method of claim 1, wherein the plurality of panoramic images include three degrees of freedom consisting of two translational components, one in the x-direction and one in the y-direction, and one rotational component consisting of a yaw.

10. The method of claim 1, wherein each panoramic image was captured from substantially the same height.

11. A computer implemented system, comprising:
    a panoramic image storage module configured to store a plurality of panoramic images, which are uncalibrated and unordered;
    one or more processors configured to:
    extract, for each panoramic image, one or more feature points;
    determine associations among the plurality of panoramic images based on the feature points;
    group the plurality of panoramic images based on the determined associations;
    select a first panoramic image based on the associations among the plurality of panoramic images;
    estimate a relative scale of a group that contains the first panoramic image based on a relative pose of each group of panoramic images;
    identify a second panoramic image, wherein the second panoramic image is associated with the first panoramic image; and
    provide a navigation from the first panoramic image to the second panoramic image.

12. The method of claim 11, wherein the plurality of panoramic images comprises a plurality of spherical panoramic images.

13. The computer implemented system of claim 11, wherein:
    at least one of the received plurality of panoramic images includes an interior building image; and
    the selected first panoramic image includes an entrance to the interior building.

14. The system of claim 11, wherein grouping the plurality of panoramic images comprises identifying, for each panoramic image, a parent panoramic image and a child panoramic image.

15. The system of claim 11, wherein the one or more processors are further configured to estimate a relative pose of each group.

16. The system of claim 11, wherein the one or more processors are further configured to propagate the relative scale of the group containing the first panoramic image to another group that does not contain the first panoramic image.

17. The system of claim 11, wherein the one or more processors are further configured to determine a location and a heading of the first panoramic image based on geographic information contained in a geocode database.

18. A computer program product comprising at least one non-transitory computer readable storage medium encoding instructions thereon that, in response to execution by a computing device, cause the computing device to perform operations comprising:

receiving a plurality of panoramic images, which are uncalibrated and unordered;

extracting, for each panoramic image, one or more feature points;

determining associations among the plurality of panoramic images based on the feature points;

grouping the plurality of panoramic images based on the determined associations;

selecting a first panoramic image from the plurality of panoramic images based on the associations among the plurality of panoramic images;

estimating a relative scale of a group that contains the first panoramic image based on a relative pose of each group of panoramic images;

identifying a second panoramic image, wherein the second image is associated with the first panoramic image; and providing a navigation from the first panoramic image to the second panoramic image.

19. The program product of claim 18, wherein:

at least one of the received plurality of panoramic images includes an interior building image; and the selected first panoramic image includes an entrance to the interior building.

20. The program product of claim 18, the instructions causing the computing device to perform operations further comprising estimating the relative pose of each group of panoramic images.

* * * * *